United States Patent [19]

Tanaka

[11] Patent Number: 5,595,619
[45] Date of Patent: Jan. 21, 1997

[54] PNEUMATIC TIRE INCLUDING SHOULDER PARTS

[75] Inventor: Masatoshi Tanaka, Takarazuka, Japan

[73] Assignee: Sumitomo Rubber Industries, Ltd., Hyogo-ken, Japan

[21] Appl. No.: 363,813

[22] Filed: Dec. 27, 1994

Related U.S. Application Data

[63] Continuation-in-part of Ser. No. 135,551, Oct. 14, 1993.

[30] Foreign Application Priority Data

| Oct. 14, 1992 | [JP] | Japan | 4-302955 |
| Aug. 5, 1993 | [JP] | Japan | 5-215015 |
| Dec. 27, 1993 | [JP] | Japan | 5-350821 |

[51] Int. Cl.$^6$ .................... B60C 101/00; B60C 111/00
[52] U.S. Cl. .................... 152/209 A; 152/454; 152/456
[58] Field of Search ................ 152/209 R, 209 A, 152/209 D, 454, 456; D12/146, 147, 148

[56] References Cited

U.S. PATENT DOCUMENTS

| D. 330,882 | 11/1992 | Hasegawa . | |
| D. 336,874 | 6/1993 | Montag et al. | D12/147 |
| D. 347,816 | 6/1994 | Maxwell et al. | D12/147 |
| 4,044,810 | 8/1977 | Taniguchi et al. . | |
| 4,173,991 | 11/1979 | Mirtain | 152/209 D |
| 4,479,525 | 10/1984 | Graas . | |
| 4,635,694 | 1/1987 | Hosokawa | 152/209 A |
| 4,947,911 | 8/1990 | Ushikubo et al. . | |
| 4,986,324 | 1/1991 | Suzuki et al. . | |
| 5,323,824 | 6/1994 | Swift et al. . | |
| 5,327,952 | 7/1994 | Glover et al. | 152/209 R |
| 5,329,980 | 7/1994 | Swift et al. | 152/209 R |
| 5,337,815 | 8/1994 | Graas | 152/209 R |
| 5,372,171 | 12/1994 | Miyazaki et al. . | |

FOREIGN PATENT DOCUMENTS

| 0428472 | 5/1991 | European Pat. Off. . | |
| 0435620 | 7/1991 | European Pat. Off. . | |
| 593288 | 4/1994 | European Pat. Off. | 152/209 R |
| 634594 | 2/1928 | France . | |
| 2484336 | 12/1981 | France . | |
| 3048489 | 10/1981 | Germany . | |
| 3525394 | 1/1986 | Germany . | |
| 904040 | 4/1988 | Japan | 152/209 A |
| 87302 | 4/1988 | Japan | 152/454 |
| 2-045203 | 2/1990 | Japan . | |
| 2-182505 | 7/1990 | Japan . | |
| 3-038408 | 2/1991 | Japan . | |
| 3-074208 | 3/1991 | Japan . | |
| 3-169719 | 7/1991 | Japan . | |
| 1255952 | 12/1971 | United Kingdom . | |
| 2221877 | 2/1990 | United Kingdom . | |

OTHER PUBLICATIONS

Patent Abstract of Japan vol. 016, No. 299 (M-1274) 2 Jul. 1992 & JP-A-04 081 305 (Bridgestone Corp.) 16 Mar. 1992.

Patent Abstract of Japan vol. 016, No. 041 (M-1206) 21 Jan. 1992 & JP-A-03 246 104 (Bridgestone Corp.).

"Time Materials and Construction," K. Jost, Automotive Engineering, Oct. 1992.

*Primary Examiner*—Steven D. Maki
*Attorney, Agent, or Firm*—Birch, Stewart, Kolasch & Birch, LLP.

[57] ABSTRACT

A pneumatic tire has a tread part with two wide circumferential grooves having a width GW of 35 mm or more and extending in either side of the tire's equator so as to divide the tread part into a pair of shoulder parts and a central part. The central part has a surface utilizing successive convex curves of a pair of inner groove walls and a central ground-contacting surface. When the tire is mounted on a regular rim, inflated with regular internal pressure and applied with normal load, widths SW1, SW2 of shoulder ground-contacting areas Fs1, Fs2 where the shoulder parts contact with the ground are different to each other.

5 Claims, 14 Drawing Sheets

CONVENTIONAL

PNEUMATIC TIRE INCLUDING SHOULDER PARTS

This application is a continuation-in-part of application Ser. No. 08/135,551 filed on Oct. 14, 1993.

BACKGROUND OF THE INVENTION

The present invention relates to a pneumatic tire, particularly a low aspect radial tire for passenger vehicles, capable of providing higher wet grip performance and reduction of tire noise and maintaining dry grip performance.

FIELD OF THE INVENTION

Recently, as automobiles become quieter tire noise has come to contribute at a higher ratio to the total noise level of an automobile, and its reduction is demanded. Such noise reduction is specifically desired in a range around 1 kHz which is easily heard by a human ear, and sounds due to a columnar resonance is one of the main sound sources in such high frequency range.

On the other hand, in order to maintain the wet grip performance, the tread of tire is generally provided with plural circumferential grooves continuously extending in the circumferential direction of tire.

In such a tire, when it is in contact with the ground, a kind of air column is formed by the road surface and the circumferential groove. Then a sound of specific wavelength, which is double the wave length of the air column is caused by airflow within the column during running.

Such a phenomenon is referred to as a columnar resonance, and provides the main source of noise at 800 to 1.2 kHz. The wavelength of the columnar resonance sound is approximately constant to give a constant frequency regardless of the tire's speed, and then increases sound inside and outside an automobile.

In order to prevent the columnar resonance, although reduction of the number or volume of the circumferential grooves is known, such reductions lead to a lower wet grip performance.

On the other hand, although the wet grip performance can be increased contrarily by increasing the number or volume of circumferential grooves, a simple increase causes reduction of the dry grip performance, because the ground-contact area is reduced. Also, this causes a reduction of steering stability as the rigidity of tread pattern is reduced, in addition to the increase in tire noise.

Conventionally, tire's performances have been adjusted by sacrificing one or more performances factors.

SUMMARY OF THE INVENTION

It is hence a primary object of the invention to provide a pneumatic tire having improved wet grip performance without loss of dry grip performance or steering stability, and yet having reduced noise.

According to one aspect of the present invention, a pneumatic tire comprising a tread part having two circumferential grooves continuously extending in the circumferential direction on either side of the tire's equator so as to divide the tread part into a pair of shoulder parts, which are located outside outer bottom edges of the circumferential grooves in the axial direction of tire, and a central part, which is located between inner bottom edges of the circumferential grooves in the axial direction of tire; wherein the central part has a surface comprising successive convex curves composed of a pair of inner groove walls extending inside, in the axial direction of tire, along a curve convex outwardly in the radial direction from the inner bottom edges of the circumferential grooves and a central ground-contacting surface smoothly connected between the pair of the inner groove walls, the central ground-contacting surface is substantially in contact with a virtual tread line between outer surfaces of the shoulder parts, the circumferential grooves have a groove width GW being in a range of 35 mm or more, and when the tire is mounted on a regular rim, inflated with regular internal pressure and applied with normal load, a shoulder ground-contacting area Fs1 where one of the shoulder parts contacts with the ground has a width SW1 in the tire's axial direction which is larger than a width SW2 in the tire's axial direction of a shoulder ground-contacting area Fs2 where the other one of the shoulder parts contacts with the ground.

A groove width GW1 of the circumferential groove adjacent to the one of the shoulder parts may be smaller than a groove width GW2 of the circumferential groove adjacent to the other one of the shoulder parts. The width SW2 may be smaller than a width CW in the tire's axial direction of a ground-contacting area Fc of the central part.

Figure 7:
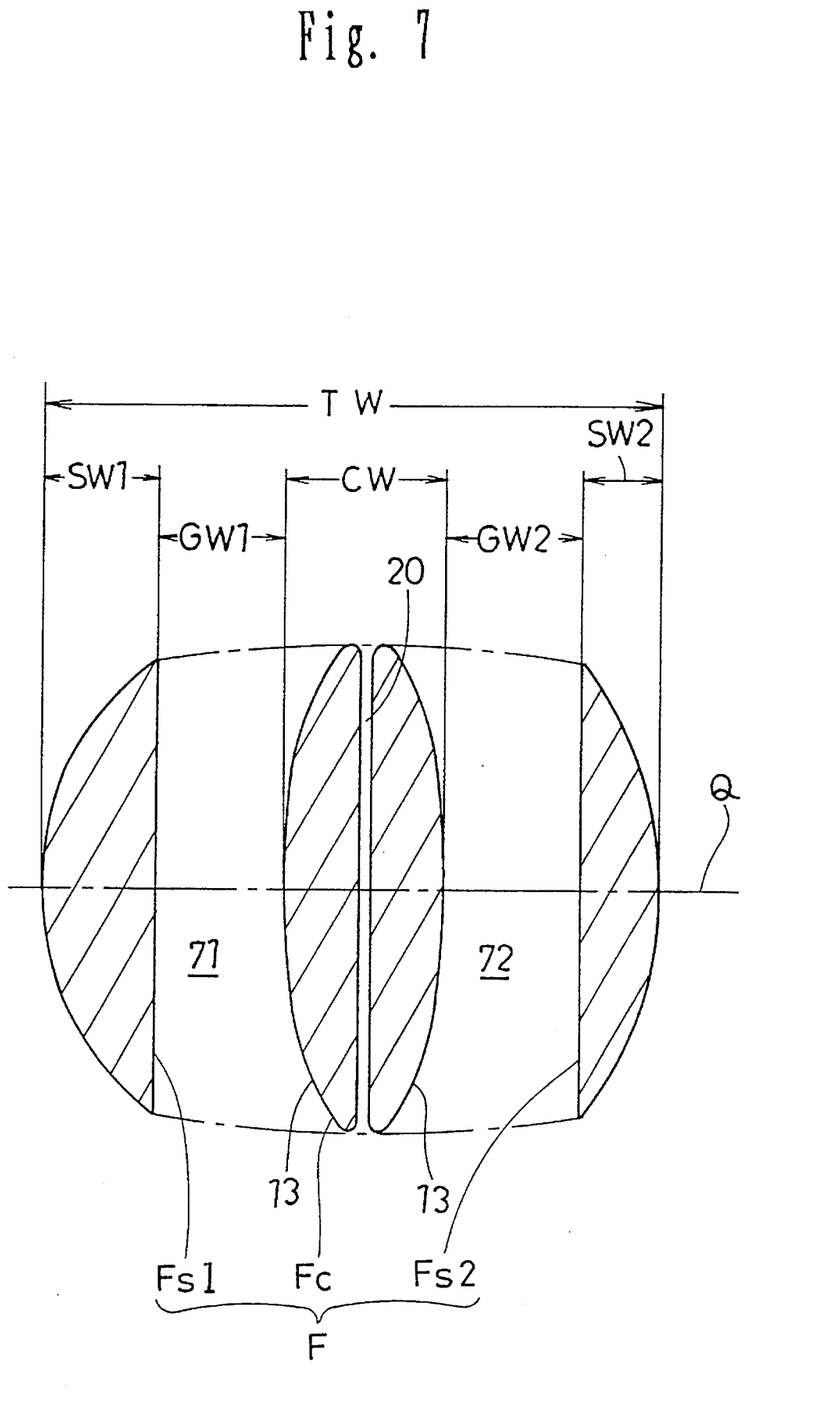
FIG. 7 is a plan view showing a ground-contacting tread area of an embodiment of the invention when a normal load is applied.

In the invention, the groove depth of the circumferential groove is gradually increased toward the outside in the tire's axial direction because of the surface of the central part formed by a convex curve, in addition, the circumferential grooves have a wide groove width GW being larger than 35 mm. As the result, the draining performance is increased, and the wet grip performance is improved so as to reduce the hydroplaning phenomenon. The circumferential groove, also, forms widened parts as shown in FIG. 7 at the front and the back of a ground-contacting center Q, when the tire comes in contact with the ground. Then, these widened parts prevent the columnar resonance and reduce the tire noise effectively. The convex form of the central part contributes to heightening of stiffness of the central part. Still more, since a width SW1 of a shoulder ground-contacting area Fs1 of one shoulder part is set greater than a width SW2 of a shoulder ground-contacting area Fs2 of the other shoulder part, by installing the former shoulder toward the outside of the car body, the tread stiffness of the outer side of the car body is increased, and a strong lateral force can be exhibited in a limited ground contact area and the dry grip performance is improved, so that the straight running stability and turning stability may be enhanced.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
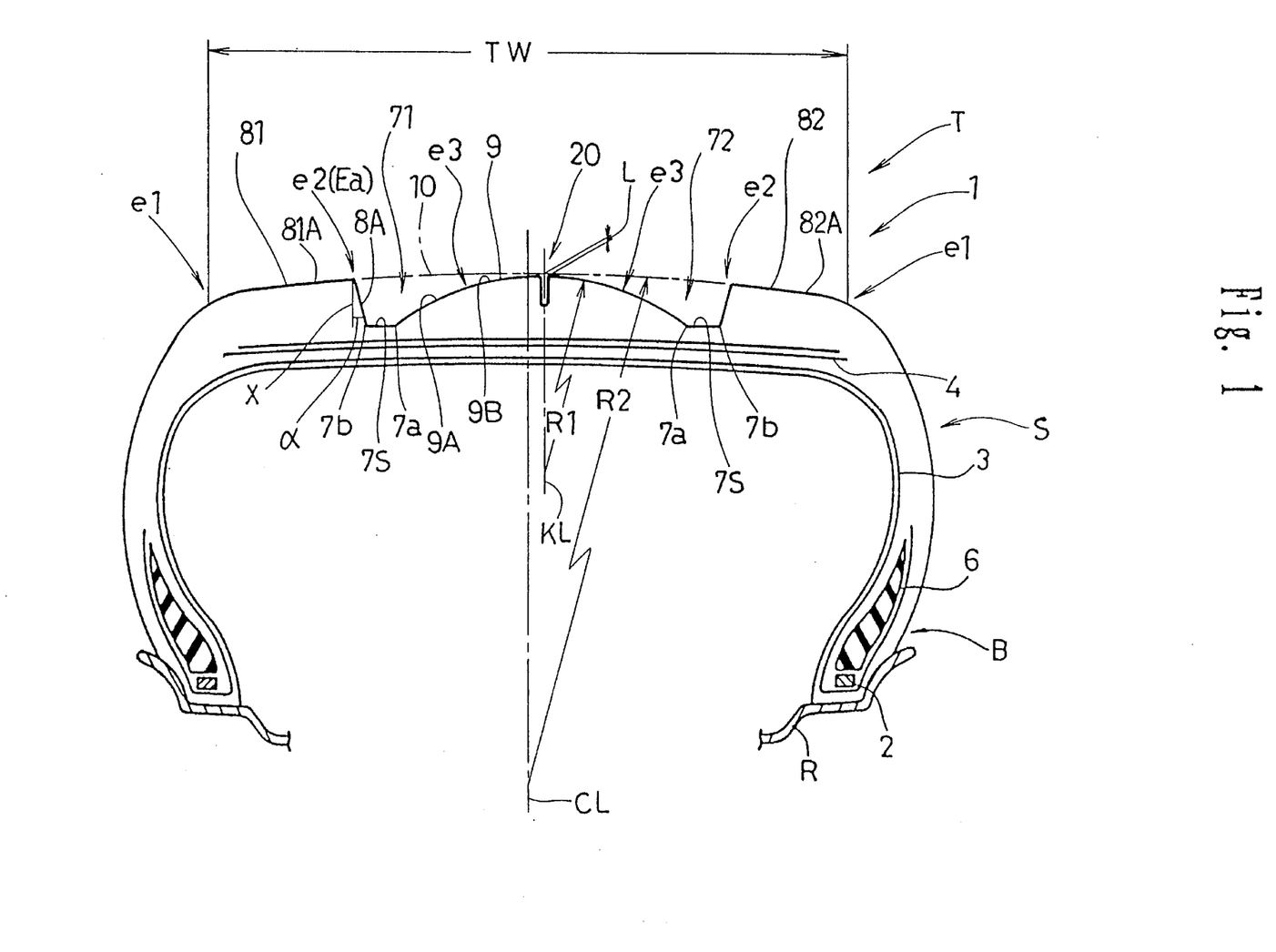
FIG. 1 is a sectional view showing an embodiment of the invention.

FIG. 1 shows a tire 1 of the invention in its normal state mounted on its regular rim R and inflated with regular internal pressure. The regular rim is the rim officially approved for the tire by for example JATMA (Japan), TRA (USA), ETRT0 (Europe) and the like; the regular internal pressure is the maximum air pressure for the tire officially specified in Air-pressure/Max.-loads Table by for example JATMA, TRA, ETRTO and the like; and a normal load is the maximum load for the tire officially specified in Air-pressure/Max.-loads Table by for example JATMA, TRA, ETRTO and the like.

The tire 1 comprises a pair of bead parts B each having a bead core 2, sidewall parts S extending from the bead parts B outwardly in the radial direction of tire, and a tread part T linking their outer ends. The aspect ratio is between 0.4 and 0.6 to provide low aspect tire for passenger vehicles. (Aspect ratio=sectional height/tire width.)

A radial carcass 3 extends between the bead parts B. The edges of the carcass 3 are folded back from inside to outside one around the bead core 2, and a belt layer 4 is provided above the carcass 3 and radially inwards of the tread part T.

In addition, a rubber bead apex 6 extending radially outward from each bead core 2 is provided between the main part of the carcass 3 and the folded back part thereof so as to maintain the shape and rigidity of the bead part B.

The belt layer 4 comprises plural belt plies of cords aligned at an angle of 15 to 30 degrees to the tire equator CL and coated by a topping rubber. The belt cords have a high tensile strength, such as steel or aromatic polyamide, and are arranged to cross to each other between the belt plies. For the carcass cords in the case of a tire for passenger vehicles, such organic fiber cords as nylon, rayon and polyester may be generally employed.

The tread part has two wide circumferential grooves 71, 72, which are positioned one at either side of the tire's equator CL and then continuously extend substantially in the circumferential direction, so that the tread part T is divided into a pair of shoulder parts 81, 82 and a central part 9. The shoulder part 81, 82 are defined as the regions outside an outer bottom edge 7b of the circumferential grooves 71, 72 in the axial direction of tire. The central part 9 is defined as the region between the inner bottom edges 7a, 7a of the circumferential grooves 71, 72 in the axial direction of tire. The circumferential grooves 71, 72 are positioned asymmetrically about the tire's equatorial surface. The circumferential grooves 71, 72 have a same groove depth D to each other, and this groove depth D is set in a range of 4 to 8% of a ground-contacting width TW of the tread such as 7.5 to 15.0 mm, preferably 8.4 mm for a tire of 205/55R15 in size.

The central part 9 has a surface with a smooth convex curve composed of a pair of inner groove walls 9A extending inside in the axial direction of tire along a curve convexed outwardly in the radial direction of tire from the inner bottom edges 7a of the grooves 71, 72 and a central ground-contacting surface 9B smoothly connected between the inner groove walls 9A, 9A.

Figure 4:
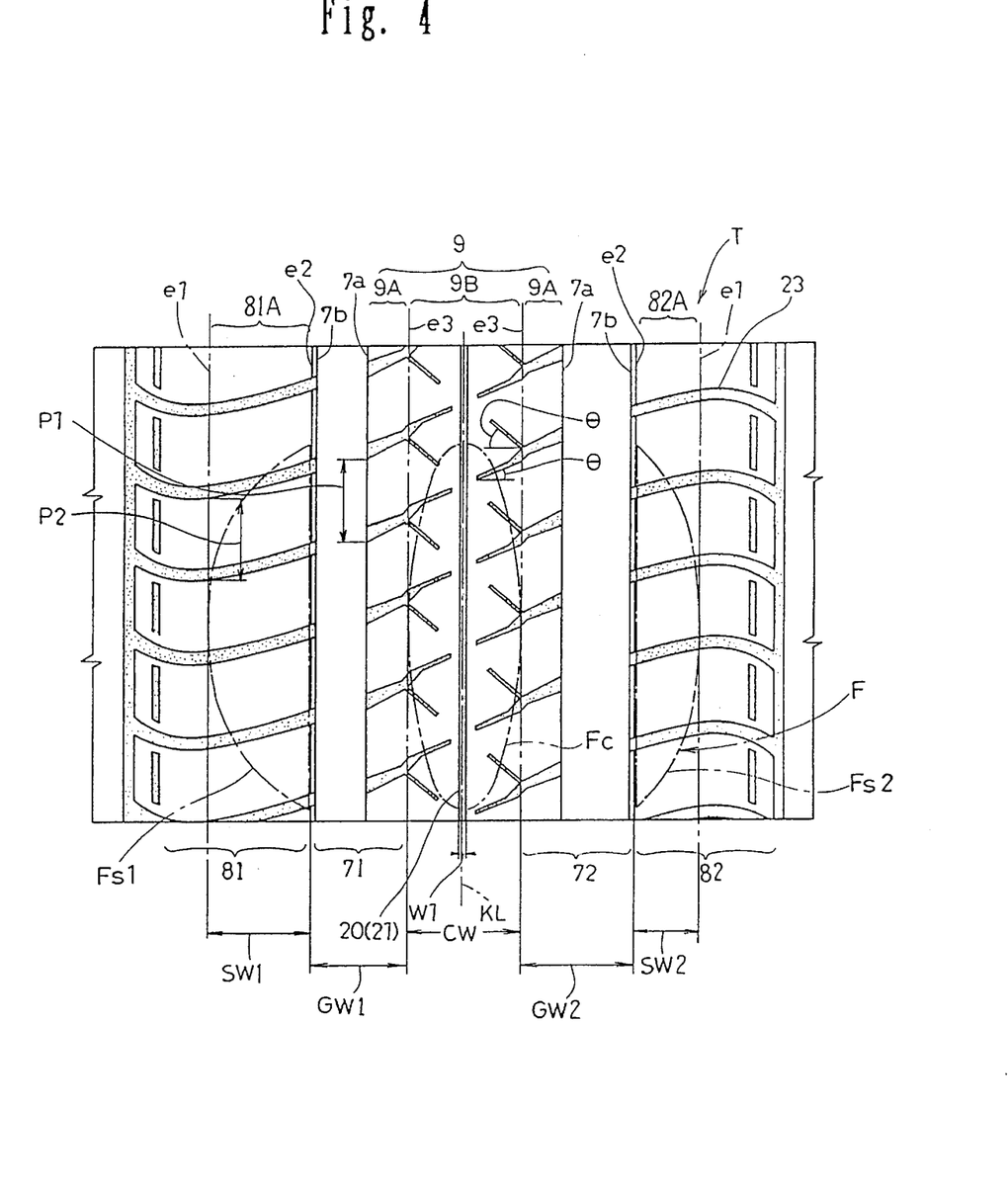
FIG. 4 is a partial flat view showing a tread pattern.

Incidentally, when a normal load is applied to the tire in the normal state, as shown in FIG. 4, a ground-contacting tread area F where the tread T contacts with the ground is obtained. The ground-contacting tread area F has a ground-contacting area Fc of the central part 9 having a thin elliptic form and ground-contacting areas Fs1, Fs2 of the shoulder parts 81, 82 having a semicircular form.

Then, the central ground-contacting surface 9B is defined as a part of the tread surface between the circumferential lines e3, e3 passing the axially outer edge of the ground-contacting area Fc. Each of shoulder ground-contacting surfaces 81A, 82A is defined as a part of the tread surface between the circumferential lines e1, e2 passing the axially outer and inner edges of the ground-contacting areas Fs1, Fs2.

The ground-contacting tread width TW is defined as an length between the circumferential lines e1, e1. Widths SW1, SW2 of the shoulder ground-contacting areas Fs1, Fs2, that is, widths of the shoulder ground-contacting surfaces 81A, 82A are also defined as an length between the circumferential lines e1, e2. Each of the shoulder ground-contacting surfaces 81A, 82B is crossed by an outer groove wall 8a extending radially outside from the outer bottom edge 7b of each of the grooves 71, 72, thus, the circumferential grooves 71, 72 are defined by the groove bottom 7S and inner and outer groove wall 9A, 8A. Groove widths GW1, GW2 of the circumferential grooves 71, 72 are defined as an length between the circumferential lines e2, e3. And a width CW of the ground-contacting area Fc, that is, a width of the central ground-contacting surface 9B is defined as an length between the circumferential lines e3, e3.

Figure 3A:
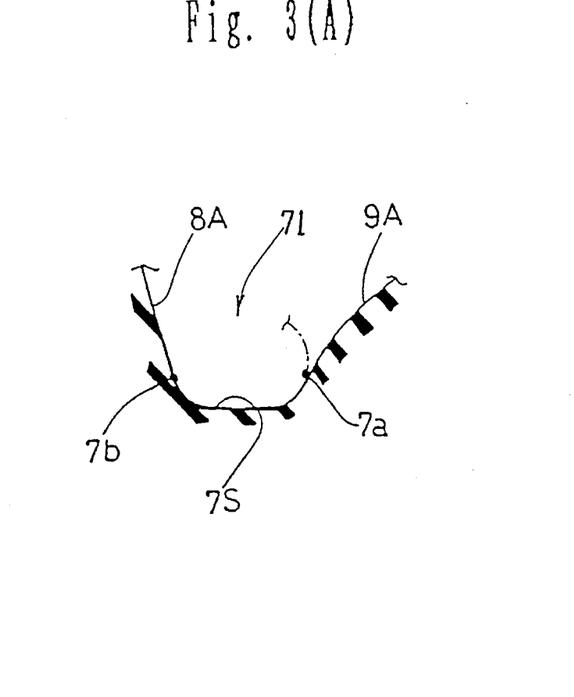
FIG. 3(A) is an enlarged partial sectional view for explanation of groove bottom ends.
Figure 3B:
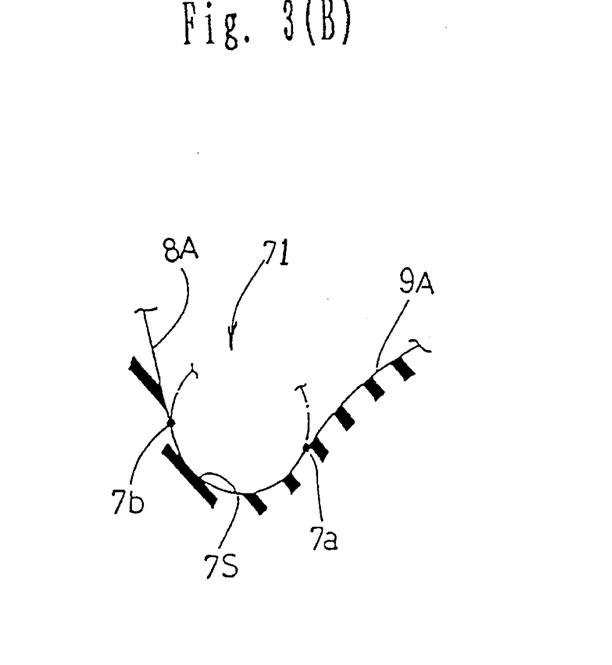
FIG. 3(B) is an enlarged partial sectional view for explanation of groove bottom ends.

The groove bottom edges 7a, 7b may be formed, when the groove bottom 7S is approximately a flat surface as in the embodiment, as bending points between the groove bottom 7S and groove walls 8A, 9A. When the groove bottom 7S is a concave surface as shown in FIGS. 3(A) and 3(B), the groove bottom edges 7a, 7b may be formed as bending points or inflection points.

The central ground-contacting surface 9B is substantially in contacting with a virtual tread line 10 connected between the shoulder ground-contacting surfaces 81A, 82A.

Here, the expression "substantially in contact" means that a minimum distance L between the central ground-contacting surface 9B and the virtual tread line 10 is within 2% of the ground-contacting tread width TW. If it is 2% or more, because the difference between the ground-contacting pressures of the shoulder part and central part is increased, the grip performance is reduced, and the wear resistance is affected. Thus, it should be preferably 1% or less, more preferably 0.5% or less.

Additionally, the virtual tread line 10 is defined as the arcuate curve of a single radius of curvature which extends between the axially inner edges Ea, Ea of the shoulder ground-contacting surfaces 81A, 82B and is in contact with tangent lines to the shoulder ground-contacting surfaces 81A, 82B at the axially inner edges Ea thereof. When the tangent is approximately parallel, the virtual tread line 10 is formed as a straight line connecting between the inner edges Ea, Ea.

In the invention, the convex central part 9 provides a sub-tread having a radius of curvature which is comparatively small and a width sufficiently narrower than the tire's width in the center of tire, thus, the hydroplaning phenomenon is prevented, and the wet grip performance is increased.

By reducing the radius of curvature of the central part 9, specifically that of the central ground-contacting surface 9B, the water draining performance to outside in both directions is increased, and the water clearing effect on a wet road is enhanced.

Incidentally, in the case where the radius of curvature R2 of the shoulder ground-contacting surfaces 81A, 82A is also reduced, the grip performance on a dry road and steering stability in cornering are reduced due to a reduction of ground contact area. Therefore, the radius of curvature R2 should be comparatively large, preferably 3 or more time the ground-contacting tread width TW. It is also allowable for the shoulder ground-contacting surfaces 81A, 82A to be approximately a straight line parallel with the tire's axis. The shoulder parts 81, 82 are provided with an arcuate part with a radius of curvature smaller than the radius of curvature R2 in the vicinity of the axially outer edge of the ground-contacting tread area F.

Figure 2:
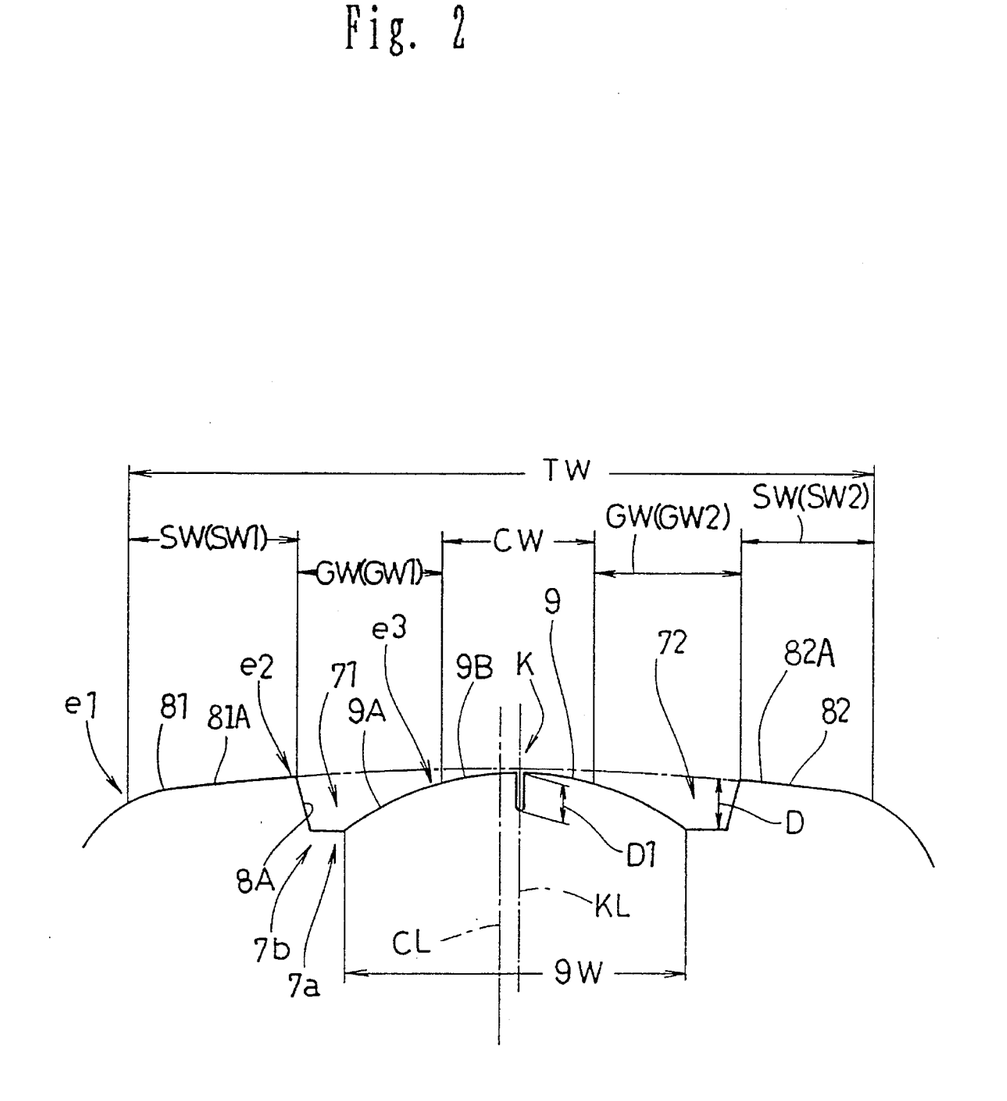
FIG. 2 is a enlarged sectional view showing a central part configuration.

FIGS. 1 and 2 show an example with the surface of the central part 9 formed by an arc with a radius of curvature R1. The radius of curvature R1 is sufficiently smaller than the radius of curvature R2, and the convex curve of the central part 9 is inscribed with the virtual tread line 10 in the example. In FIG. 1, the distance L is drawn on purpose to explain the phrase "substantially in contact". In the embodiment, the radius of curvature R1 has its center on a plane KL parallel with the tire equatorial plane CL passing at the contact point K between the central part 9 and the virtual tread line 10. The central part 9 is symmetrical about the plane KL remote from the tire equatorial plane CL.

It is also preferable that the radius of curvature R1 is set within a range of 0.4 to 1.5 times, more preferable 0.45 to 0.55 times the ground-contacting tread width TW. If it is less than 0.4 times, the width CW of the central ground-contacting surface 9B is too reduced, and the dry grip performance tends to be significantly reduced. If it is more than 1.5 times, the draining effect is insufficient, and the wet grip performance is inferior.

Figure 14:
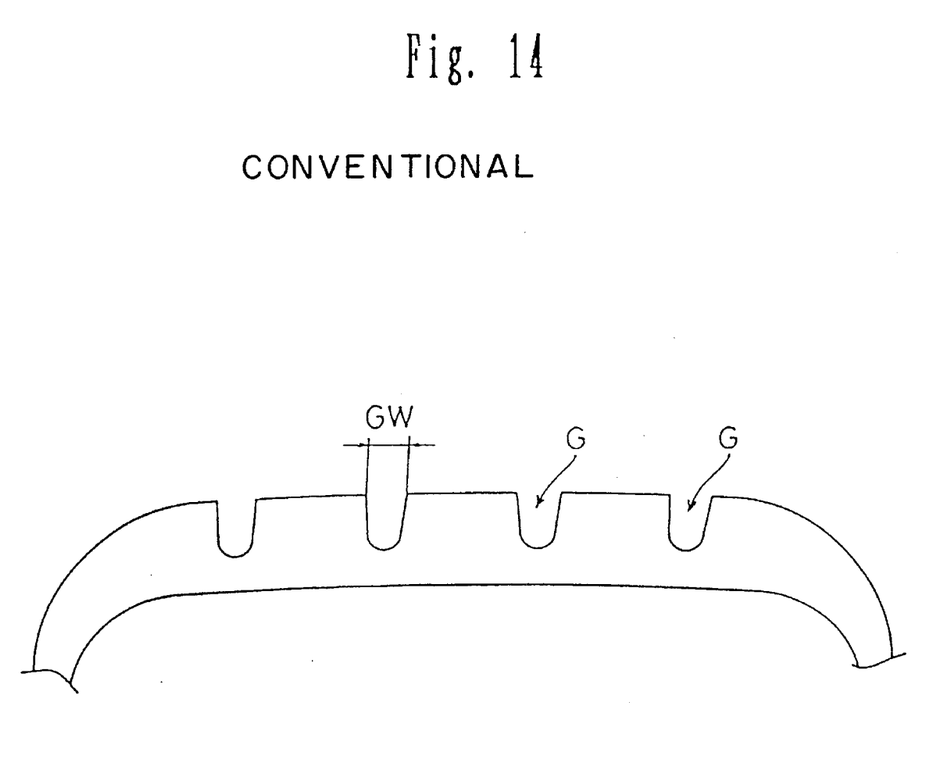
FIG. 14 is a sectional view showing a tread profile of a conventional tire.

Furthermore, in the shoulder parts 81, 82, it is desirable that the outer groove walls 8A of the grooves 71, 72 are formed by a relatively steep and non-arcuate line such as a straight line, at an angle α of 0 to 40 degrees, preferably 5 to 25 degrees to a radial line X of tire, so that an edge effect on a road surface is provided at the inner edges Ea of the shoulder parts 81, 82 with a high ground-contacting pressure to help maintain the dry grip performance by increasing lateral force, and thereby cornering power. The outer groove wall 8A may be formed as a convex curve similar to the inner groove wall 9A, or extended in a zigzag, as shown in FIG. 14, to increase traction.

Figure 5:
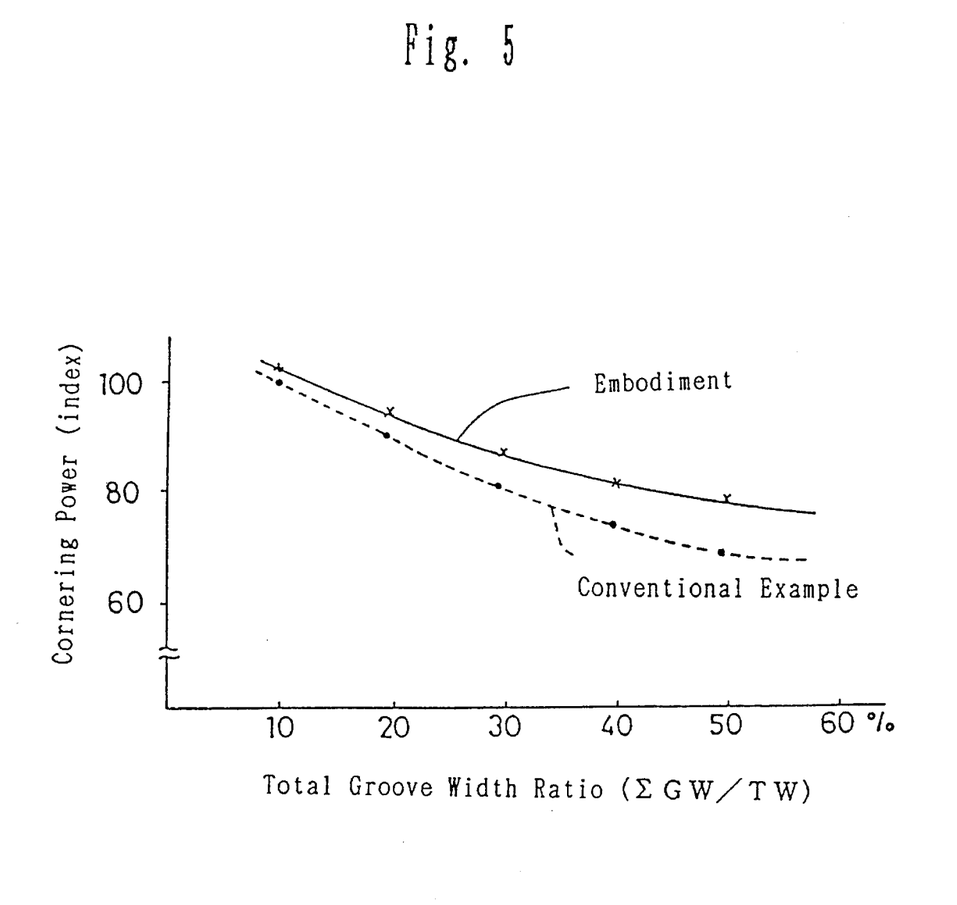
FIG. 5 is a diagram showing the relation between the total groove width ratio and cornering power.

Regarding the circumferential grooves 71, 72, it was found that a total groove width ratio 2GW/TW of a total groove width 2GW of the circumferential grooves 71, 72 to the ground-contact tread width TW affects the cornering power and wet grip performance. FIG. 5 shows the result of measuring the cornering power of a tire of 205/55 R15 in size with a central part in a form of a single arc as shown in FIG. 1 and a conventional tire with four circumferential grooves G as shown in FIG. 14 by changing the total groove width ratio Σ0 GW/TW. For the total groove width ratio, a value of the ratio 2GW/TW was employed for the embodiment, and a value of the ratio (Σ GW)/TW for the conventional example. The cornering power was measured on a drum tester in the normal state. It was shown that the embodiment shows a higher value in comparison with the conventional tire. This is considered to be because, when the total groove width ratio defined as above is constant, the inner groove wall 9A of the convex curve contributes to increasing the tire's lateral rigidity.

Figure 6:
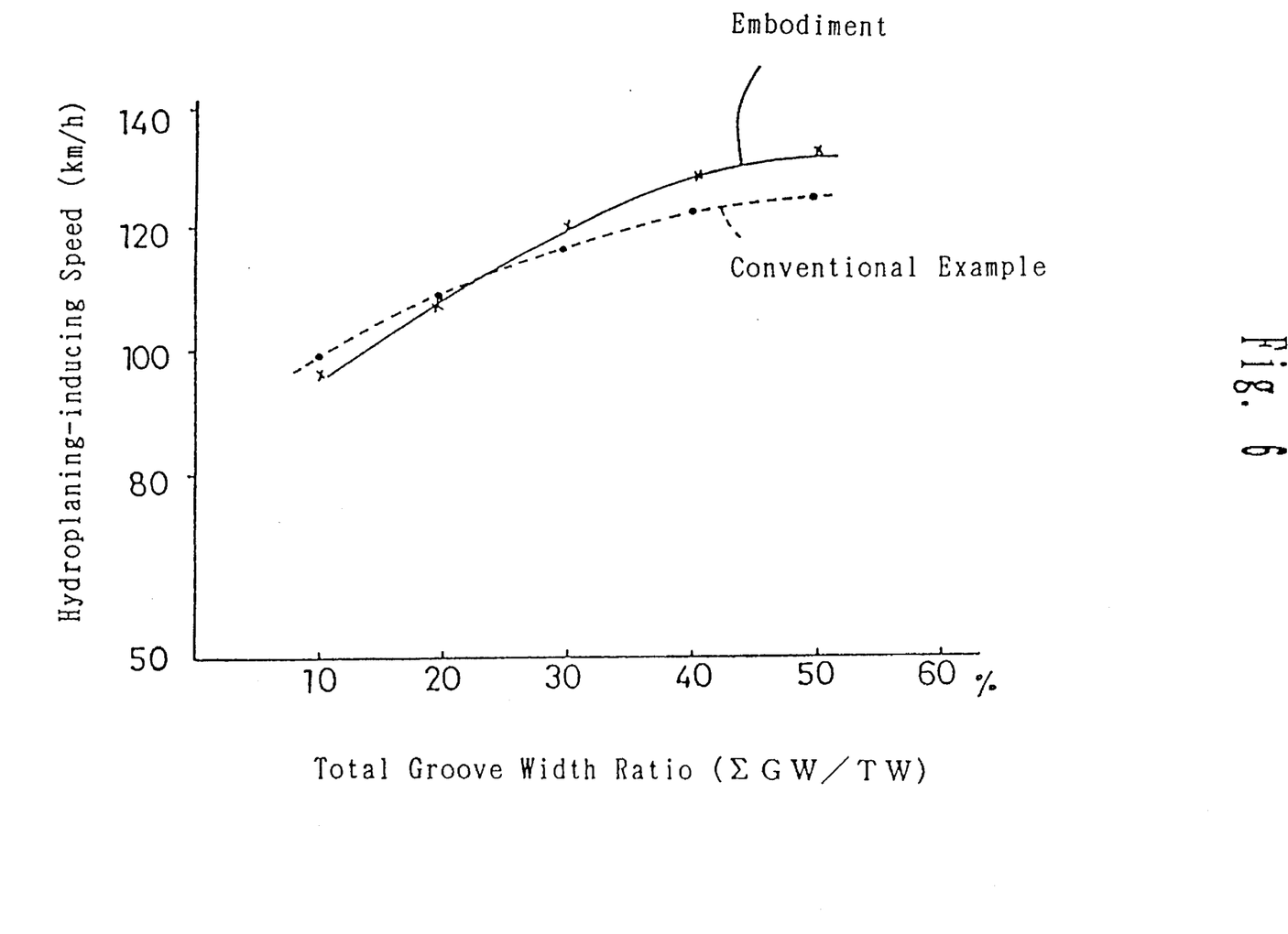
FIG. 6 is a graph showing the relation between the total groove width ratio and hydroplaning-inducing speed.

FIG. 6 shows the result of measuring, in a similar manner, the hydroplaning inducing speed. It was shown that the hydroplaning phenomenon occurred at a higher speed in the embodiment, compared to the conventional tire. This is considered to be because the circumferential grooves 71, 72 form widened parts 13 as shown in FIG. 7 at the front and the back of the ground-contacting center Q, when the tire comes in contact with the ground. The widened part 13 increases the draining performance. Incidentally, in the case where the value of the ratio (Σ GW)/TW exceeds 50%, the increasing of the inhibitory effect of hydroplaning phenomenon is not expected as shown in FIG. 6, and the cornering power becomes insufficient. Therefore, the value of the ratio (Σ GW)/TW is preferably less than 50%, more preferably less than 45%.

Also, the widened part 13 prevents occurrence of the columnar resonance in the circumferential grooves 71, 72, thereby performing the reduction of tire noise.

Figure 8:
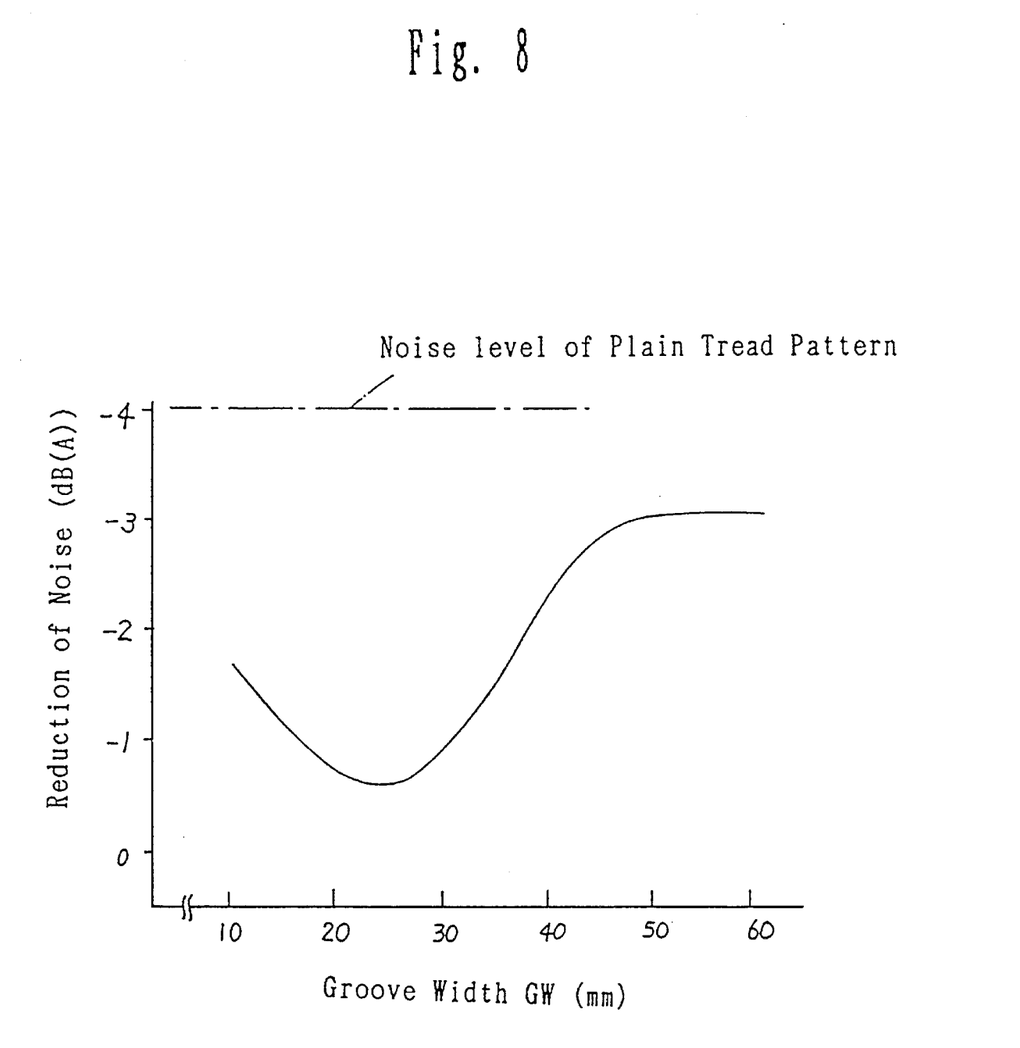
FIG. 8 is a diagram showing a result of a noise test.

To further enhance the inhibitory effect of air column resonance, the groove widths GW1, GW2 of the circumferential groove 71, 72 must be 35 mm or more, preferably 40 mm or more. If more than 50 mm, however, the effects are hardly changed. It is known from the result in FIG. 8 showing the measurement of pass-by noise by varying the groove widths GW at a fixed groove depth of the circumferential grooves 71, 72. As shown in FIG. 8, the pass-by noise reaches the peak at the groove width GW of 25 mm, and then drops suddenly, and an excellent low noise characteristic is noted at 35 mm and over. Nevertheless, although the tire of the invention has a high cornering power as shown in FIG. 5, the increase in the groove width GW causes to decrease the ground contact area, thereby lowering the dry grip performance and steering stability.

In the invention, therefore, in order to heighten the steering stability and dry grip performance furthermore while maintaining the excellent low noise performance and hydroplaning resistance, the tread surface is formed asymmetrically, by defining the width SW1 of one shoulder ground-contacting surface 81A greater then the width SW2 of the other shoulder ground-contacting surface 82A.

This is, by installing the tire with the broader shoulder part 81 directed outward of the car, the tread stiffness directed outward of the car is increased, and a strong lateral force can be exhibited, so that the steering stability, in particular, the turning stability can be enhanced. In this invention, the width SW2 of the other shoulder ground-contacting surface 82A directed inward of the car is preferred to be 0.09 times or more the ground-contacting tread width TW, for example, 15 mm or more in the tire size 205/55R15. If smaller than 0.09 times, the ground contacting pressure of the narrower shoulder ground-contacting surface 82A increases unevenly, and an uneven wear occurs.

Also, in the embodiment, the width CW of the central ground-contacting surface 9B is defined greater than the width SW2, while the groove width GW1 of the circumferential groove 71 adjacent to the broader shoulder ground-contacting surface 81A is defined smaller than the groove width GW2 of the circumferential groove 72 adjacent to the narrower shoulder ground-contacting surface 82A. This is because the stability upon ground-contact is enhanced by the broadening the width CW of the central ground-contacting surface 9B by defined CW>SW2. To the contrary, if CW≦SW2, the straight running performance is particularly lowered, and an uneven wear is likely to occur in the shoulder ground-contacting surface 82A. Hence, preferably, the width CW should be about 1.4 to 2.0 times, more preferably 1.4 to 1.7 times the width SW2. If the groove width GW1 is more than the groove width GW2, the central part 9 is shifted excessively to the inner side of the car body, and thereby the lateral force decreases and the asymmetricity becomes excessive, and the steering stability is lowered and the other demerits are likely to occur.

Incidentally, to maintain the dry grip performance, wear resistance and steering stability, the width CW is preferably set about 5 to 40% of the ground-contacting tread width TW, or more preferably 15 to 35%. The width 9W of the central part 9, or the distance between the inner groove bottom edges 7a, 7a is preferably set about 40 to 55% of the ground-contacting tread width TW.

Figure 9:
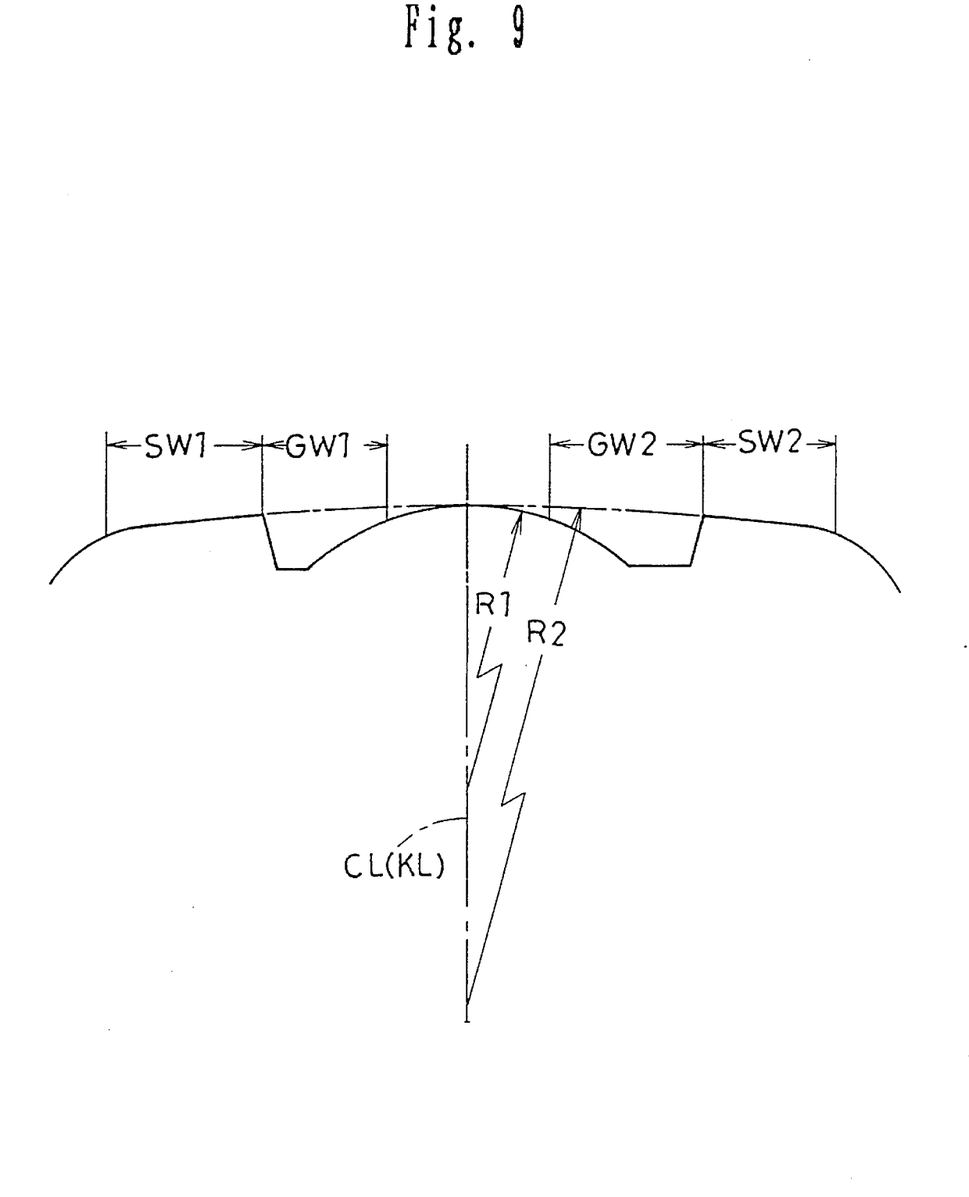
FIG. 9 is a sectional view of a tire showing another example of a central part configuration.
Figure 10:
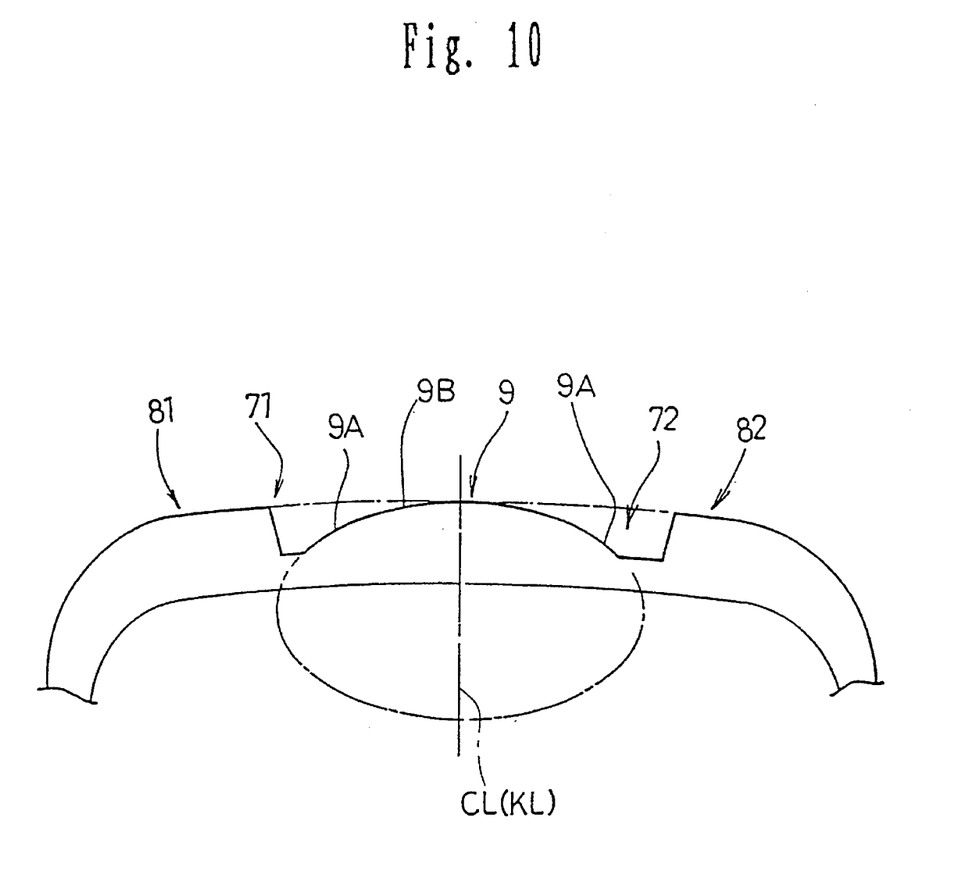
FIG. 10 is a sectional view of a tire showing still another example of a central part configuration.

In the embodiment, the plane KL of the central portion 9 is disposed away from the tire equatorial plane CL, but, as shown in FIG. 9, by setting the plane KL in the coincidence with the tire equatorial plane CL and varying the right and left groove widths GW1, GW2, the width SW1 of one shoulder ground-contacting surface 81A may be defined greater than the width SW2 of the other shoulder ground-contacting surface 82A. Meanwhile, as shown in FIG. 10, the surface of the central part 9 is may be formed in an elliptic shape or a curve approximate to an ellipse.

Figure 11:
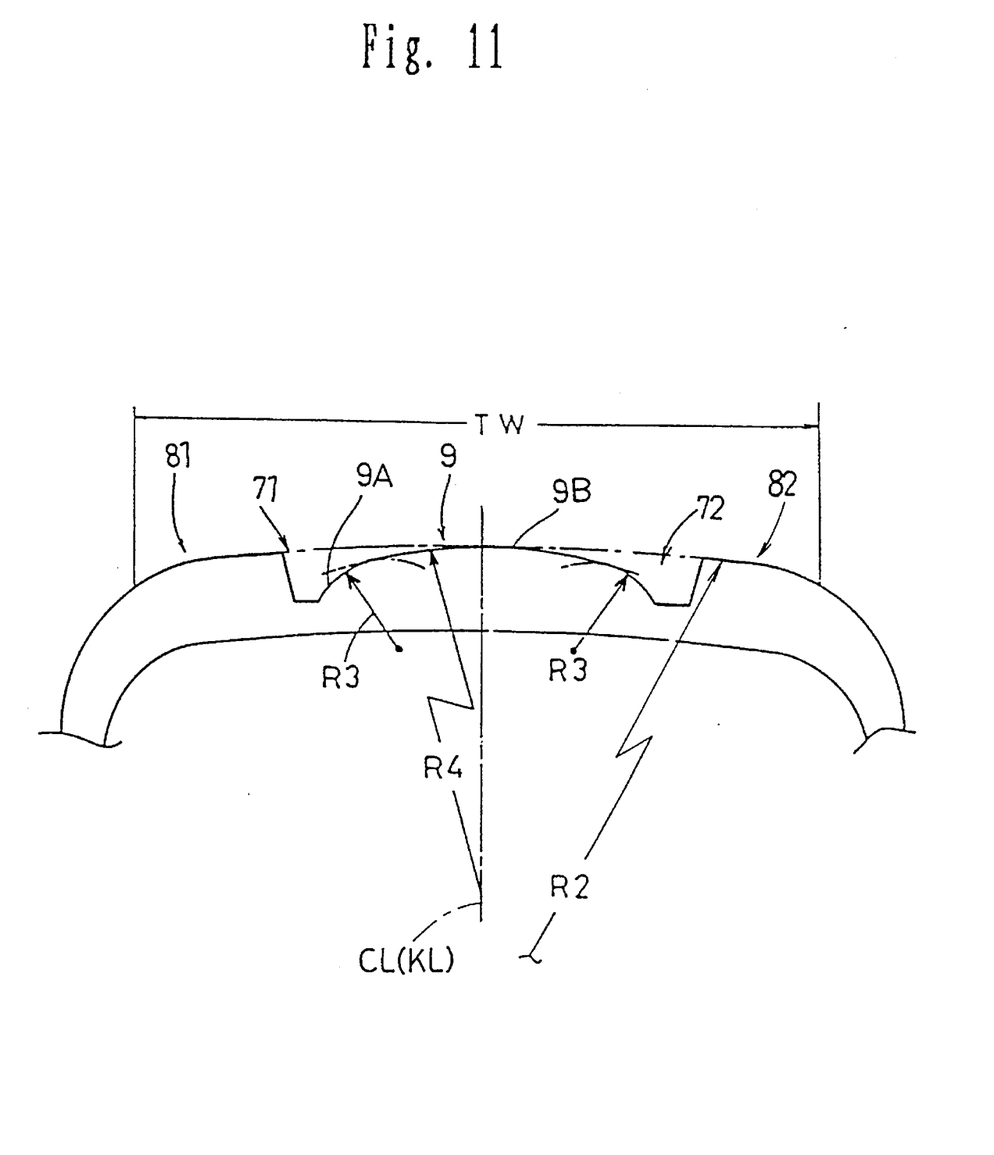
FIG. 11 is a sectional view of a tire showing yet another example of a central part configuration.

FIG. 11 shows that the groove wall 9A and the central ground-contacting surface 9B have different radii of curvature R3, R4. The radius of curvature R3 is less than the radius of curvature R4 of the central ground-contacting surface 9B and the radius of curvature R2 of the shoulder ground-contacting surface 81A, 82A, respectively, and the lowest limit thereof is preferably 5% or more of the ground-contacting tread width TW. If it is less than 5%, the draining effect tends to be insufficient. The highest limit is at a value identical to the radius of curvature R4, and then the central surface is formed by a single arc. The radius of curvature R4 can be close to the radius of curvature R2 as far as the wet grip performance is not inferior. In addition, in order to decrease the emission noise toward outside the car, the radius of curvature R3 of one inner groove wall 9A directed outward of the car may be set greater than that of the other inner groove wall 9A.

In the embodiment, also, the central part 9 is provided with a radiation groove 21 including at least a circumferential radiation groove 20 for heat release as shown in FIG. 4.

The radiation groove 21 comprises, in the embodiment, a circumferential radiation groove 20 and lateral radiation grooves 22. The circumferential radiation groove 20 is formed as a narrow groove continuously extending substantially along the central plane KL. The radiation groove 20 is capable of maintaining the pattern rigidity, while providing a heat radiation effect, by setting the groove depth D1 thereof at 0.4 to 0.9 times the groove depth D of the circumferential groove 7, and a groove width W1 at 5 mm or less. If the groove width W1 is more than 5 mm, and the groove depth D1 is more than 0.9 times the groove depth D, then columnar resonance is caused. If the groove depth D1 is less than 0.4 times the groove depth D, the heat radiation effect is insufficient.

The lateral radiation groove 22 extends from a position of an inner end spaced from the circumferential radiation groove 20 toward the outside in the axial direction of tire at an inclination θ of 10 degrees or more to the axial direction of tire, and an outer end thereof opens into the circumferential groove 7.

Thus, because the lateral radiation groove 22 is spaced from the circumferential radiation groove 20, the rigidity of the central part 9 is maintained, and the steering stability is assured.

A groove depth D2 of the lateral radiation groove 22 is similarly 0.4 to 0.9 times the groove depth D. If the groove depth D2 is more than 0.9 times the groove depth D, and the inclination θ is less than 10 degrees, then the pitch noise of the lateral radiation groove 22 is excessively high. If the groove depth D2 is less than 0.4 times the groove depth D, a sufficient heat radiation effect cannot be expected.

In the circumferential and lateral radiation grooves 20 and 22, an angle established by a groove wall in the grooves 20, 22 and a normal on the tread surface, that is, the inclination gradient of the groove wall is set at 15 degrees or less, more preferably 5 degrees or less, respectively, and a dimensional change of the radiation groove 21 due to wear of the tire is thereby controlled.

In the embodiment, a shoulder groove 23 is additionally formed in the shoulder part 8. Each shoulder groove 23 is an open groove with an inner end thereof opening in the circumferential groove 7 and an outer end in the tread end. Thus, by opening it in the circumferential groove, the heat radiation effect is further increased, increase of temperature in the shoulder groove 8 is significantly reduced, and the draining performance is enhanced.

Figure 12:
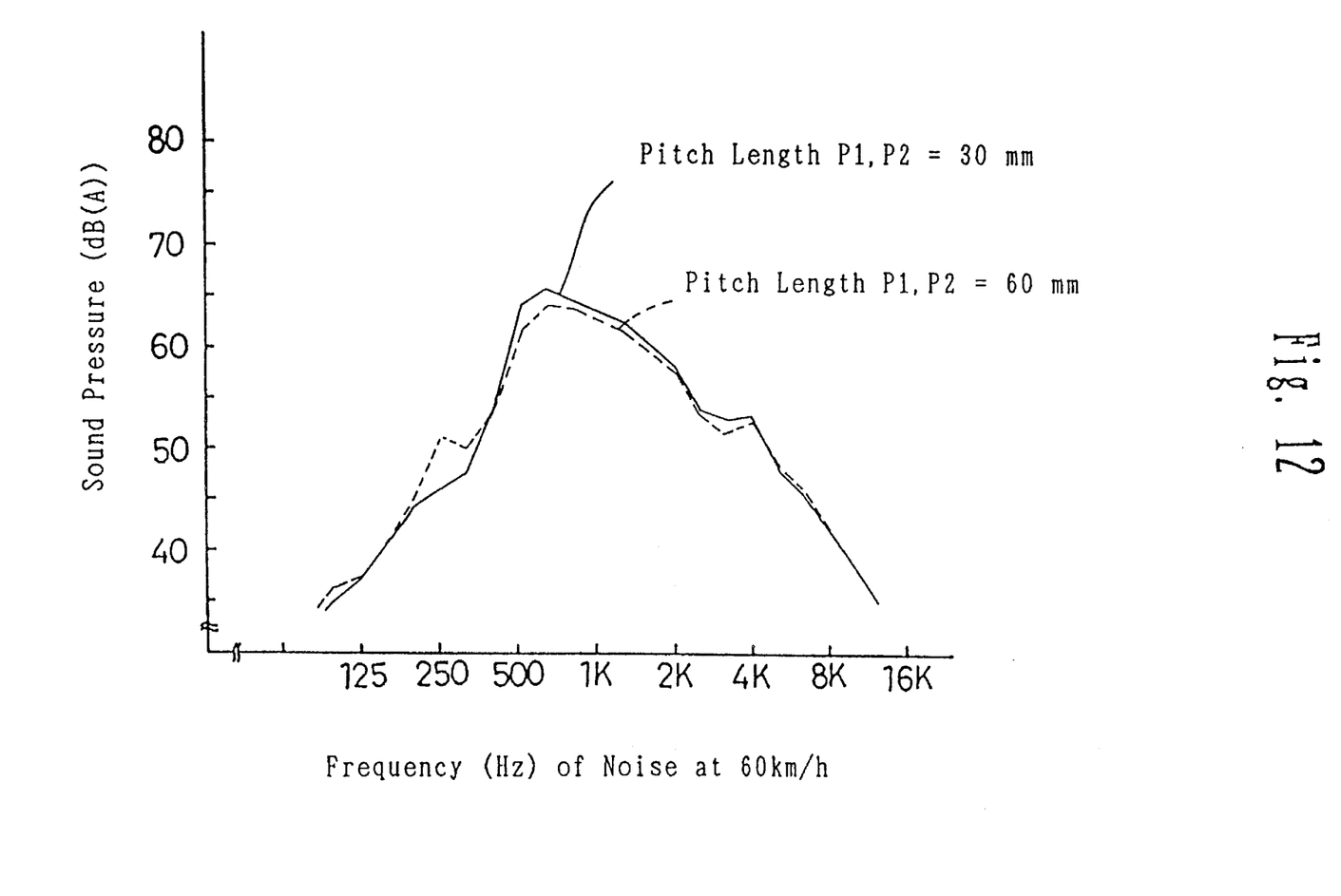
FIG. 12 is a graph showing a result of frequency analysis of tire noise in an embodiment of the invention.

An average pitch length of a lateral groove in the circumferential direction of tire is generally about 30 mm, and the resultant primary frequency at a speed of 60 km/h, for example, is 500 to 600 Hz, thus, showing a coincidence with a frequency of noise peak in a tire with a tread profile having the convex central part 9, as shown in FIG. 12. Therefore, in the embodiment, an average pitch length P1 of the lateral radiation groove 22 and an average pitch length P2 of the shoulder groove 23 are preferably set at 40 mm or more, respectively, so that a primary pitch frequency of the grooves 22, 23 are different from the noise peak.

Figure 13:
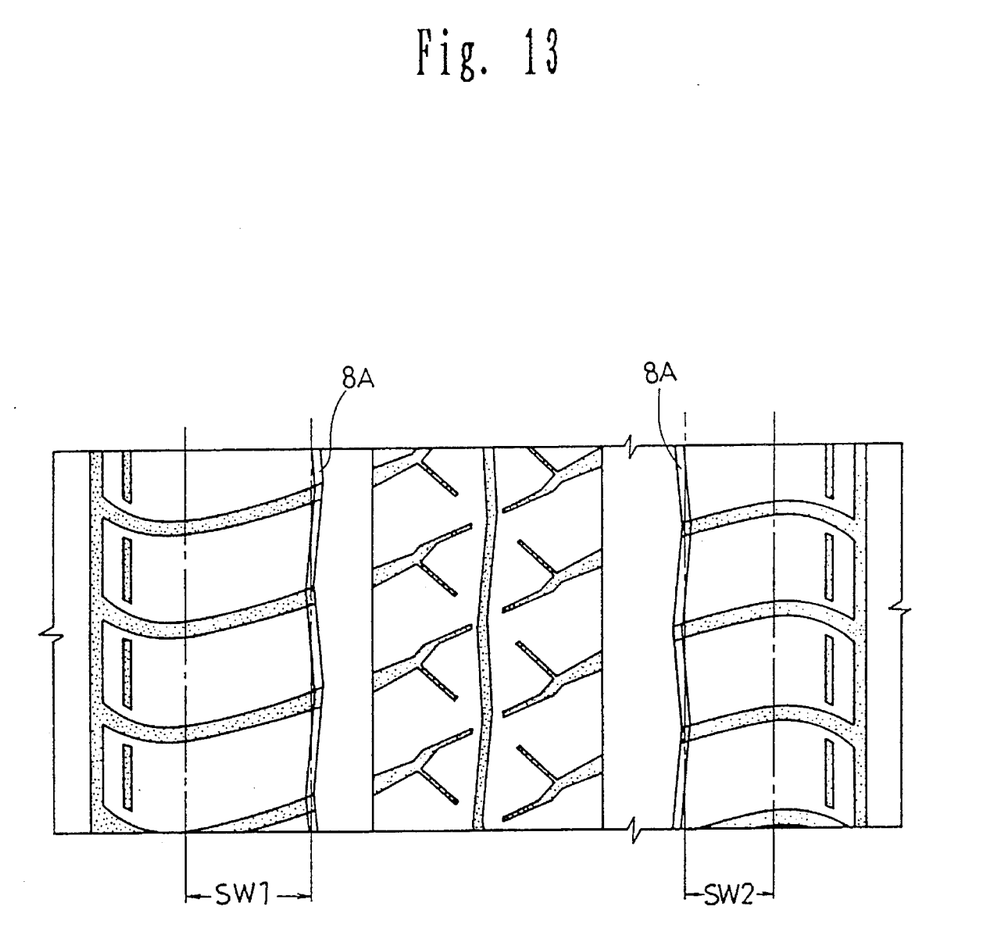
FIG. 13 is a partial flat view of a tread pattern showing another example of circumferential grooves and circumferential radiation grooves.

FIG. 13 shows another example of radiation grooves 21 and the circumferential grooves 7. The groove walls of the circumferential radiation grooves 20 and the groove wall 8A of the circumferential groove 7 may be formed as a zigzag.

EXAMPLE

A tire of 255/40 ZR17 in size was produced according to specifications shown in Table 1, and measured for the pass-by noise, a hydroplaning-inducing speed, straight running stability, cornering stability and wear durability. The results of the measurement were compared and shown in the table. The tires were tested and measured in the state mounted on its regular rim R and inflated with regular internal pressure.

TABLE 1

|  | Embodiment | | | | | | Comparative |
| --- | --- | --- | --- | --- | --- | --- | --- |
|  | 1 | 2 | 3 | 4 | 5 | 6 | 1 |
| Ground-Contacting Tread Width TW (mm) | 200 | 200 | 200 | 200 | 200 | 200 | 200 |
| Circumferential Groove | | | | | | | |
| Number of Grooves | 2 | 2 | 2 | 2 | 2 | 2 | 2 |
| Groove Width GW1 (mm) | 40 | 40 | 48 | 35 | 40 | 45 | 40 |
| Groove Width GW2 (mm) | 40 | 40 | 48 | 45 | 50 | 35 | 40 |
| Total Groove Width Ratio 2GW/TW | 0.40 | 0.40 | 0.48 | 0.45 | 0.45 | 0.45 | 0.40 |
| Groove Depth D (mm) | 10 | 10 | 10 | 10 | 10 | 10 | 10 |
| Shoulder Part | | | | | | | |
| Width SW1 (mm) | 40 | 45 | 40 | 40 | 45 | 40 | 35 |
| Width SW2 (mm) | 30 | 25 | 14 | 30 | 35 | 30 | 35 |
| Central Part | | | | | | | |
| Width CW (mm) | 50 | 50 | 50 | 50 | 30 | 50 | 50 |
| Radius R1 (mm) | 85 | 85 | 85 | 85 | 85 | 85 | 85 |
| Radius R2 (mm) | 520 | 520 | 520 | 520 | 520 | 520 | 520 |
| Pass-by Noise (dB(A)) | 71.1 | 71.3 | 70.4 | 71.5 | 70.7 | 71.5 | 71.0 |
| Hydroplaning-inducing Speed *1 | 99 | 97 | 120 | 99 | 110 | 99 | 100 |
| Straight Running Stability *2 | 3 | 3 | 3 | 3 | 2.5 | 3 | 3 |
| Cornering Stability *2 | 3.5 | 4.0 | 3.5 | 4.0 | 3.5 | 3.5 | 3 |
| Wear Durability *1 | 97 | 85 | 70 | 99 | 75 | 98 | 100 |

*1 Indicated as the index with the Comparative 1 taken as 100. The greater figure means the better performance.
*2 Indicated as the index 5 with the Comparative 1 taken as 3. The greater figure means the better performance.

What is claimed is:

1. A pneumatic tire comprising a tread part having two circumferential grooves continuously extending in the circumferential direction, one of said circumferential grooves being disposed on one side of the tire's equator and the other of the circumferential grooves being disposed on the other side of the tire's equator so as to divide the tread part into a pair of shoulder parts, which are located outside outer bottom edges of the circumferential grooves in the axial direction of tire, and a central part, the central part being located between inner bottom edges of the circumferential grooves in the axial direction of the tire; wherein the central part has a surface comprising successive convex curves including a pair of inner groove walls, each of the inner groove walls being convex and extending inward in the tire's axial direction along a curve convexed outwardly in the radial direction from the inner bottom edges, and a central ground-contacting surface smoothly connected between the pair of the inner groove walls, the central ground-contacting surface has a width CW being in a range of 0.15 to 0.35 times a ground-contact tread width TW and is substantially in contact with a virtual tread line between outer surfaces of the shoulder parts, a width 9W of the central part is in a range of 0.4 to 0.55 times the ground-contact tread width TW, the circumferential grooves have a groove width GW being in a range of 35 mm or more, and when the tire is mounted on a regular rim, inflated with regular internal pressure and applied with normal load, a) a shoulder ground-contacting area Fs1 where one of the shoulder parts contacts with the ground has a width SW1 in the tire's axial direction which is larger than a width SW2 in the tire's axial direction of a shoulder ground-contacting area Fs2 where the other one of the shoulder parts contacts with the ground, and b) a groove width GW1 of the circumferential groove adjacent to said one of the shoulder parts having the larger width SW1 is smaller than a groove width GW2 of the circumferential groove adjacent to said other one of the shoulder parts having the smaller width SW2.

2. The pneumatic tire according to claim 1, wherein said width SW2 of the shoulder ground-contacting area Fs2 is smaller than a width CW in the tire's axial direction of a ground-contacting area Fc where the central part contacts with the ground.

3. The pneumatic tire according to claim 1, wherein said surface of the central part is configured by an arc of a single curvature of radius R1, said radius of curvature R1 being in a range of 0.45 to 0.55 times the ground-contacting tread width TW.

4. The pneumatic tire according to claim 1, wherein the width CW of the central ground-contacting surface is in a range of 1.4 to 1.7 times the smaller width SW2 of said other one of the shoulder parts.

5. The pneumatic tire according to claim 1, wherein the smaller width SW2 of said other one of the shoulder parts is not less than 0.09 times the ground-contact tread width TW.

* * * * *